UNITED STATES PATENT OFFICE.

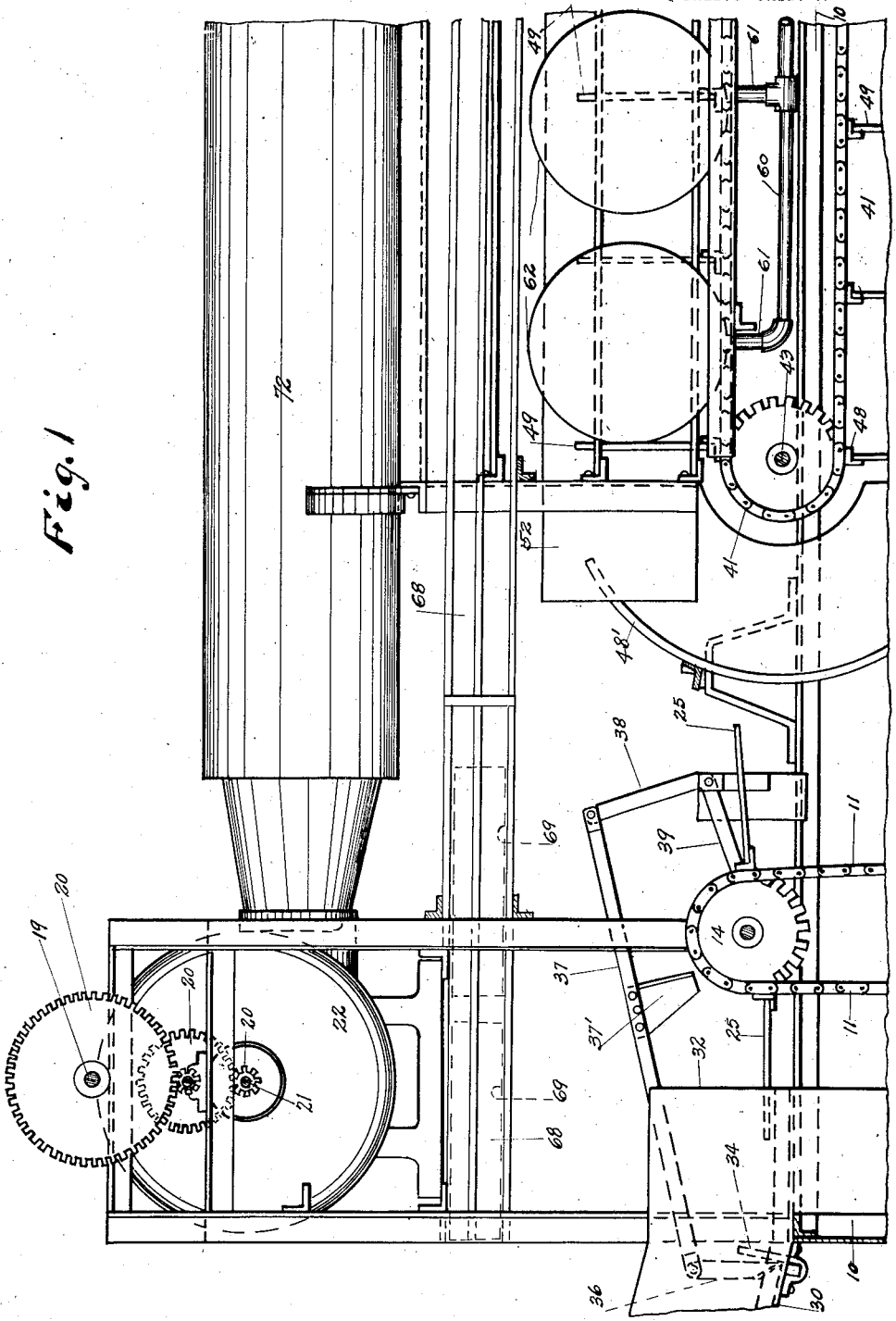

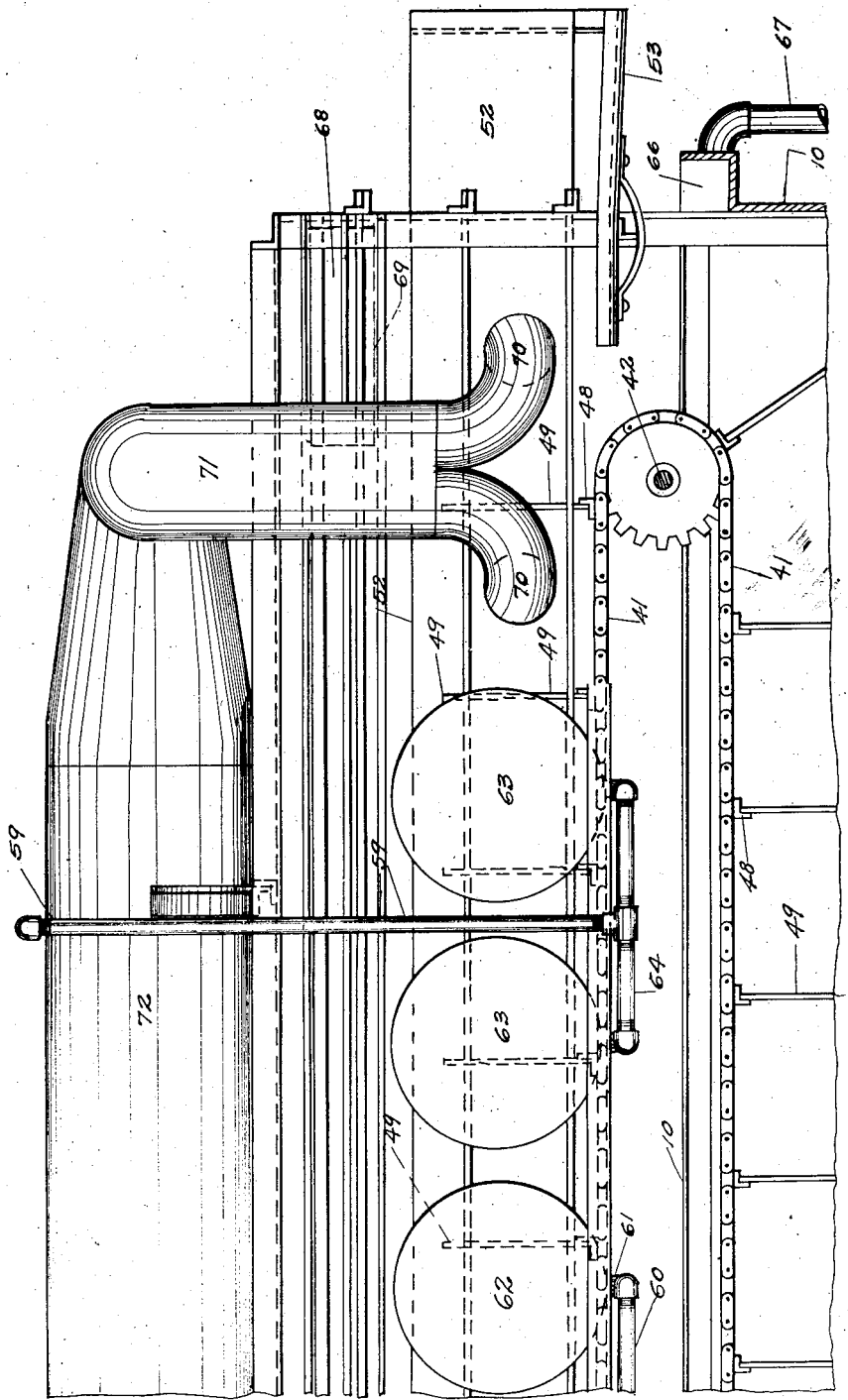

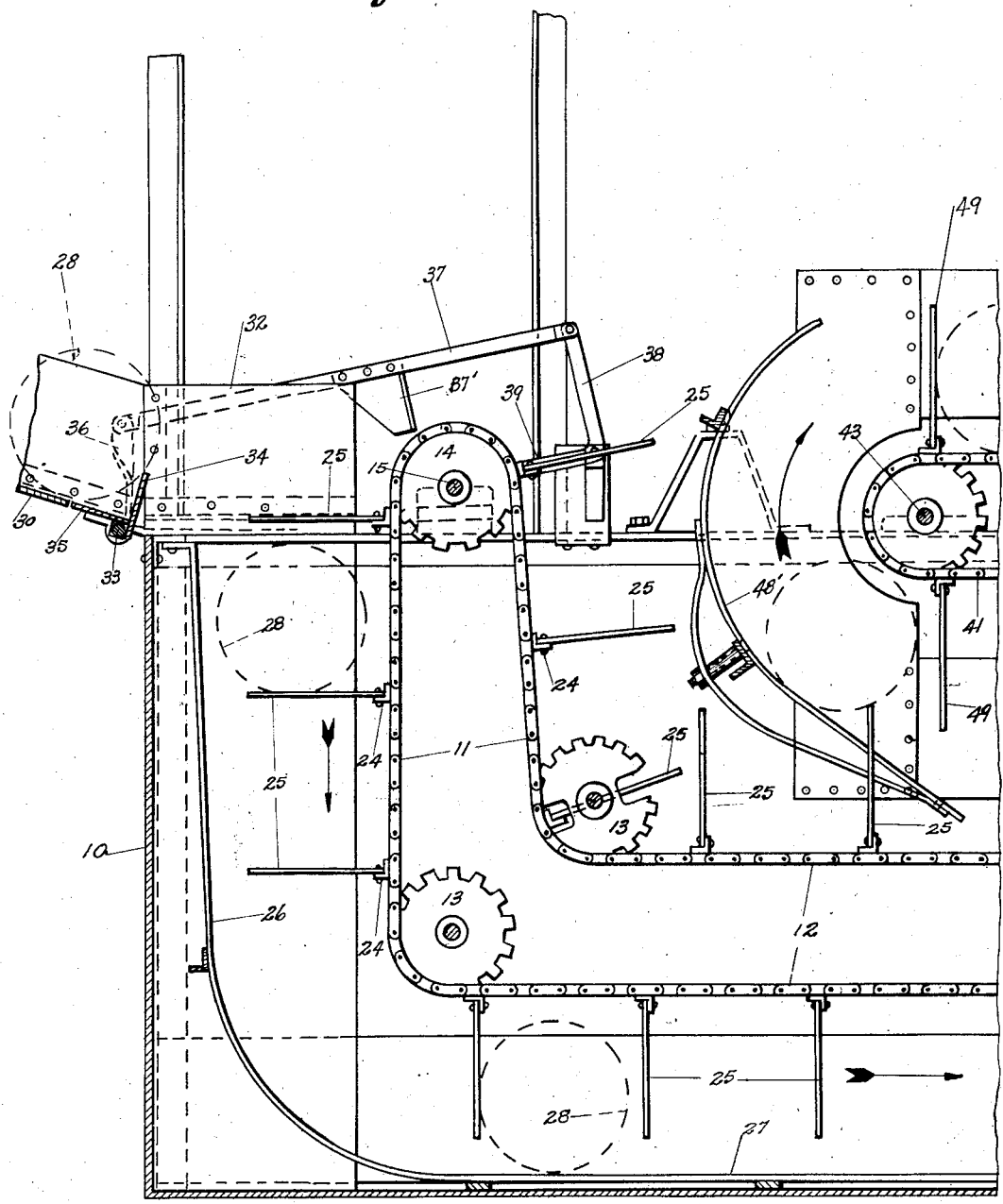

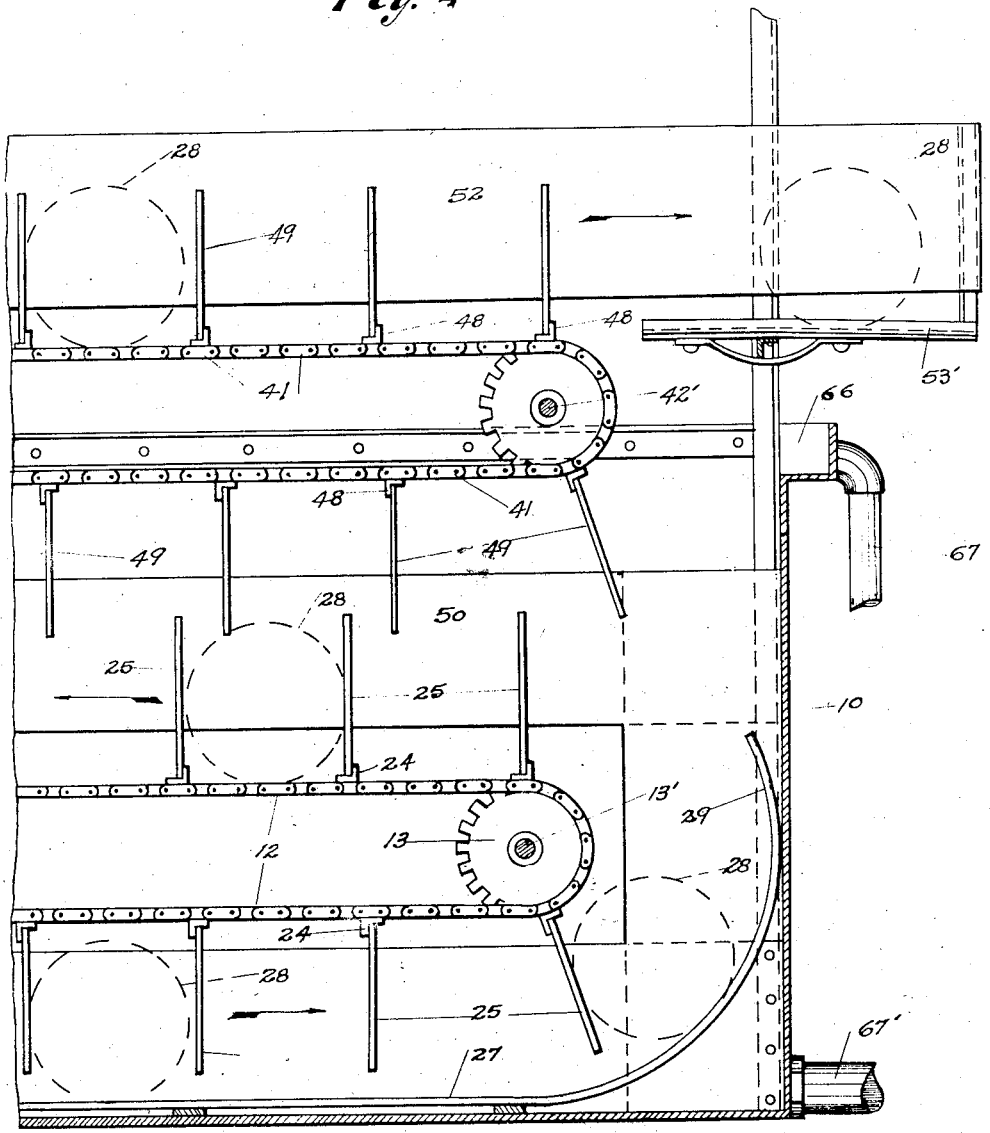

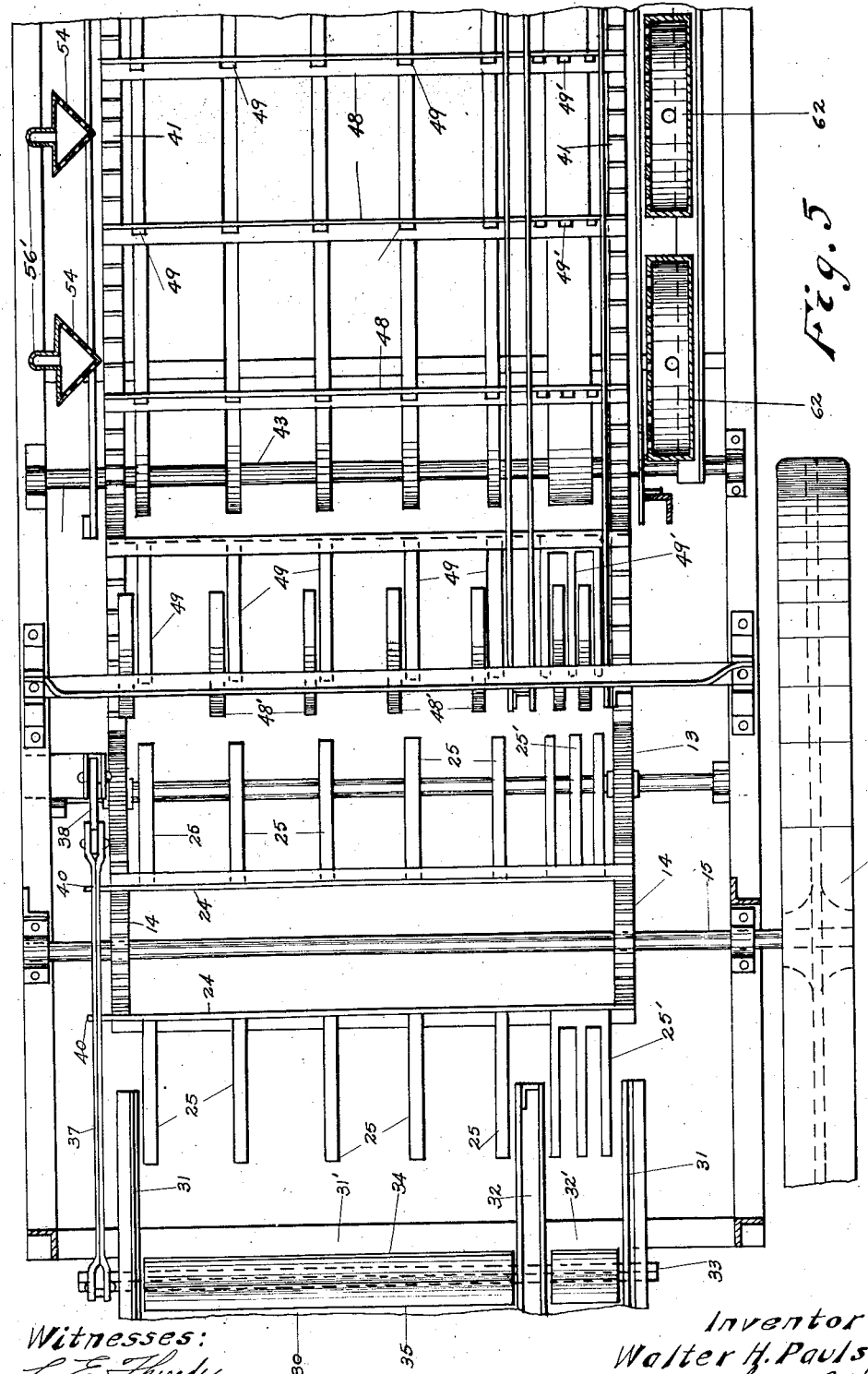

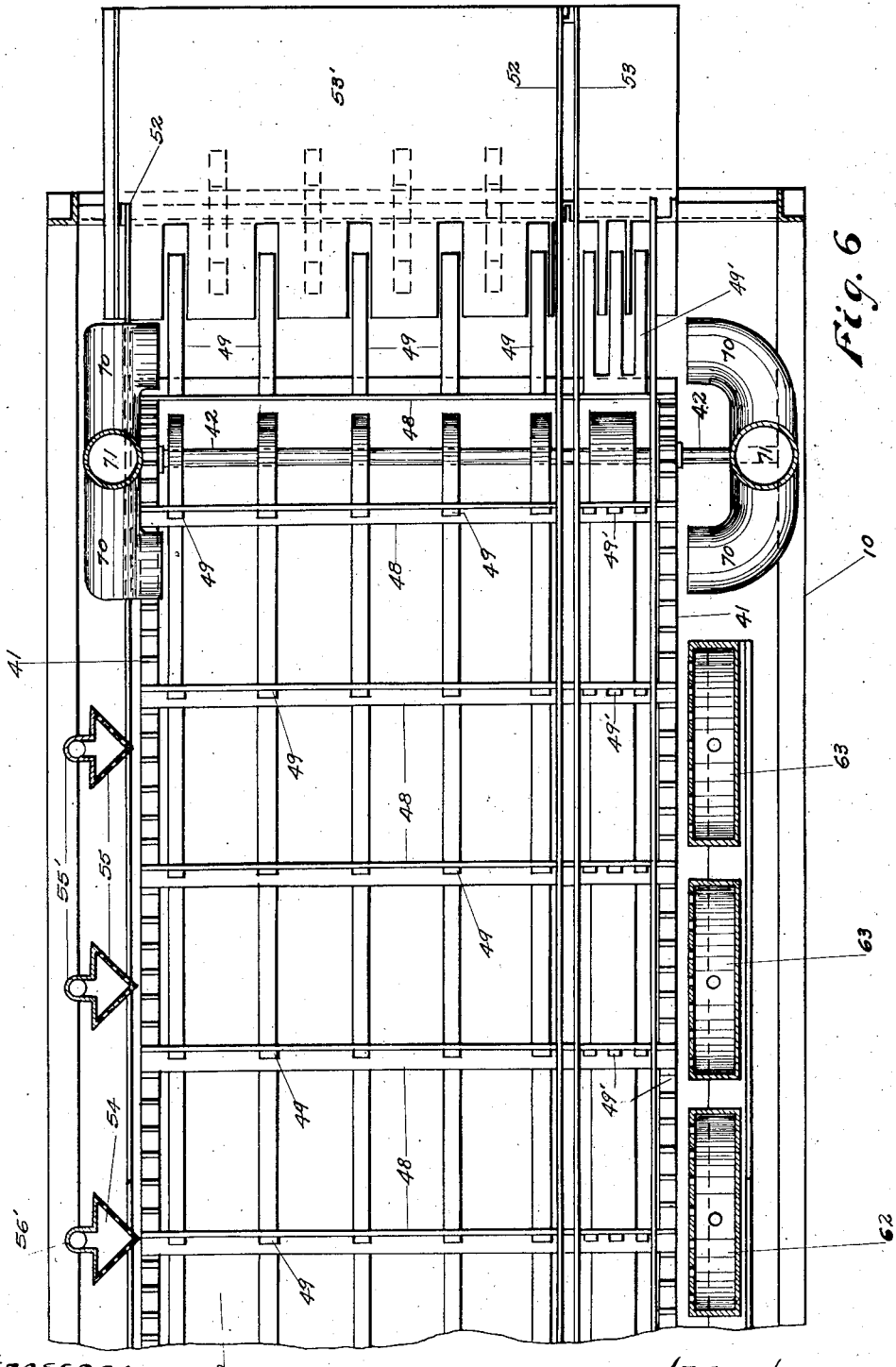

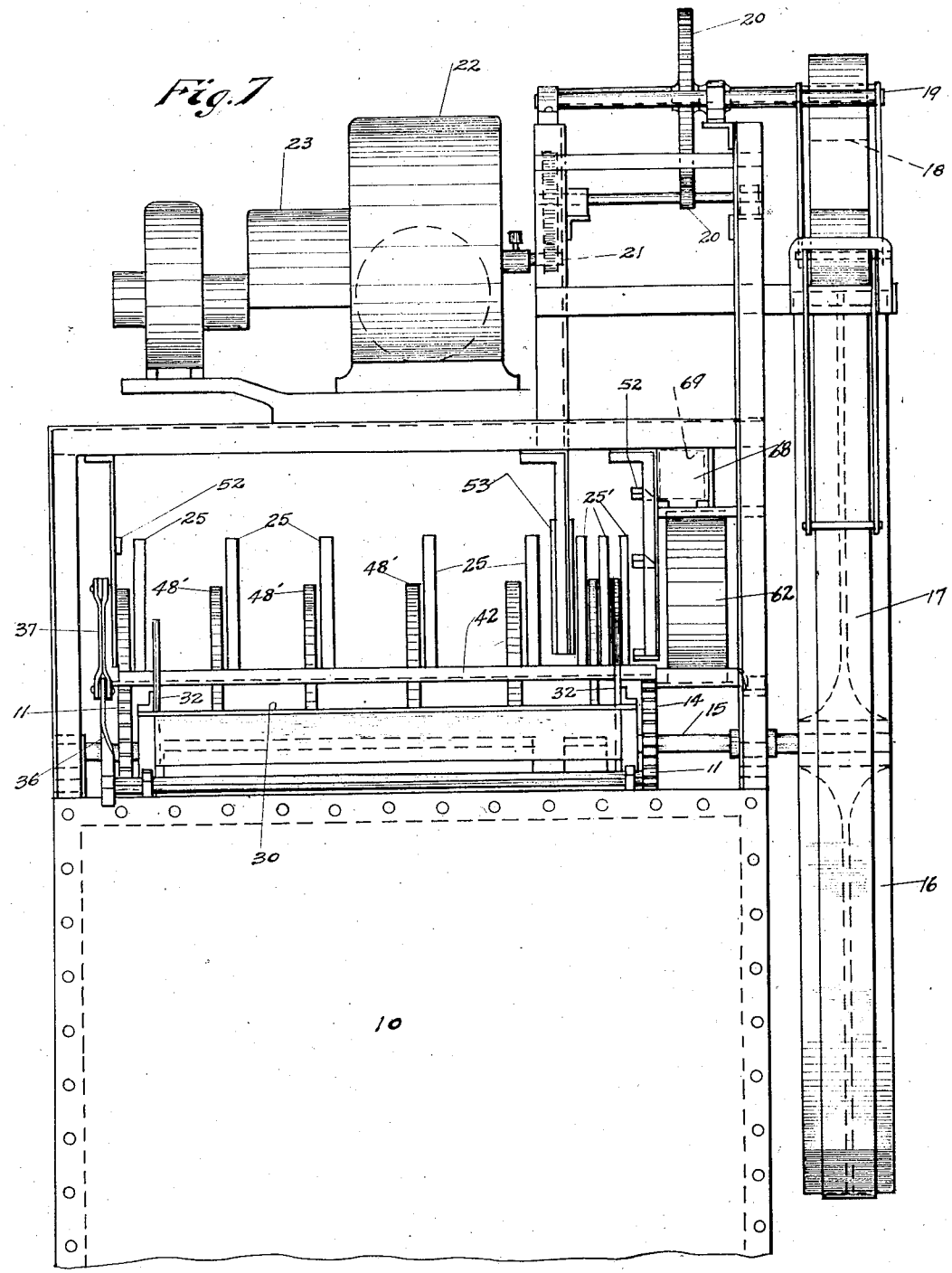

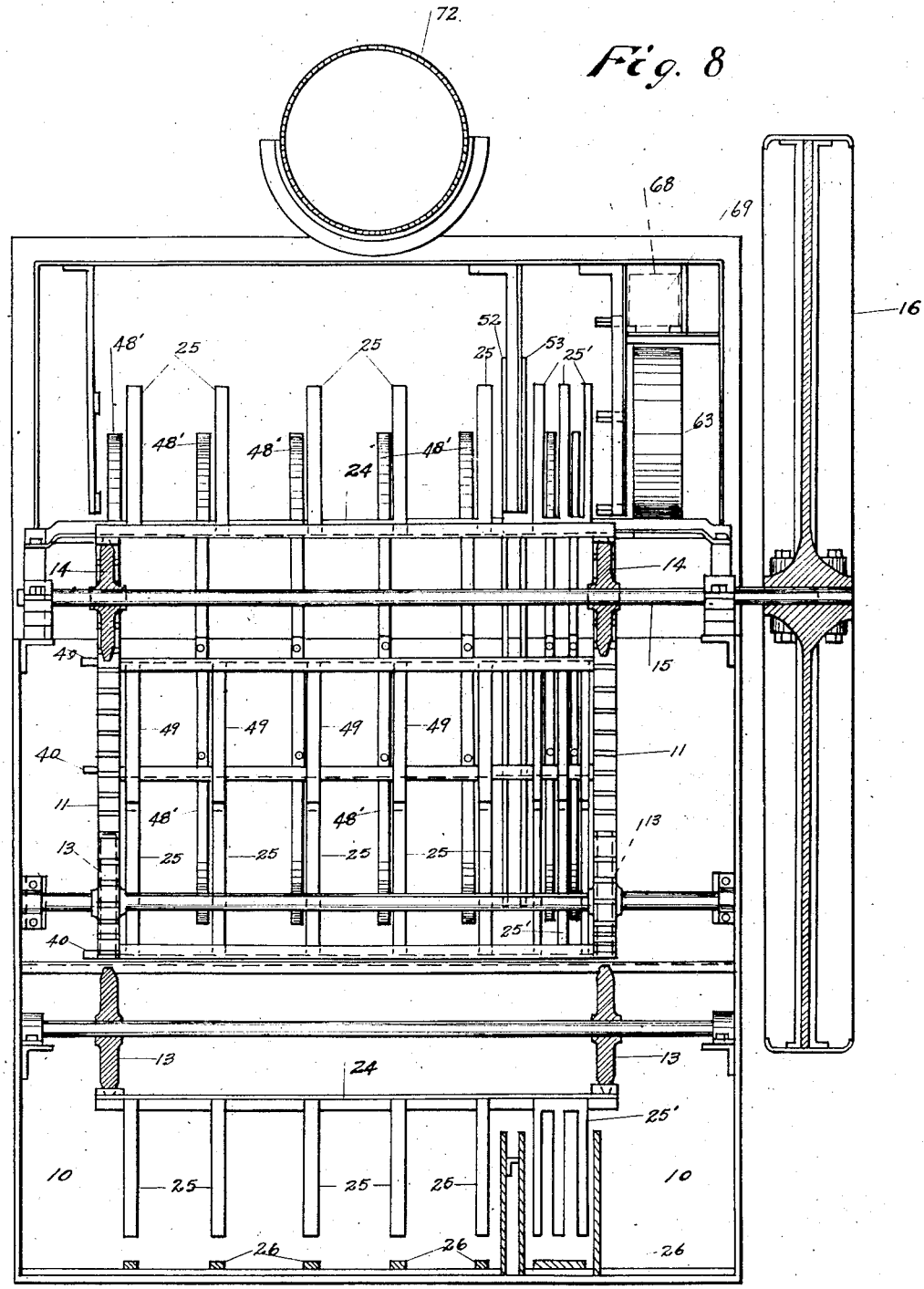

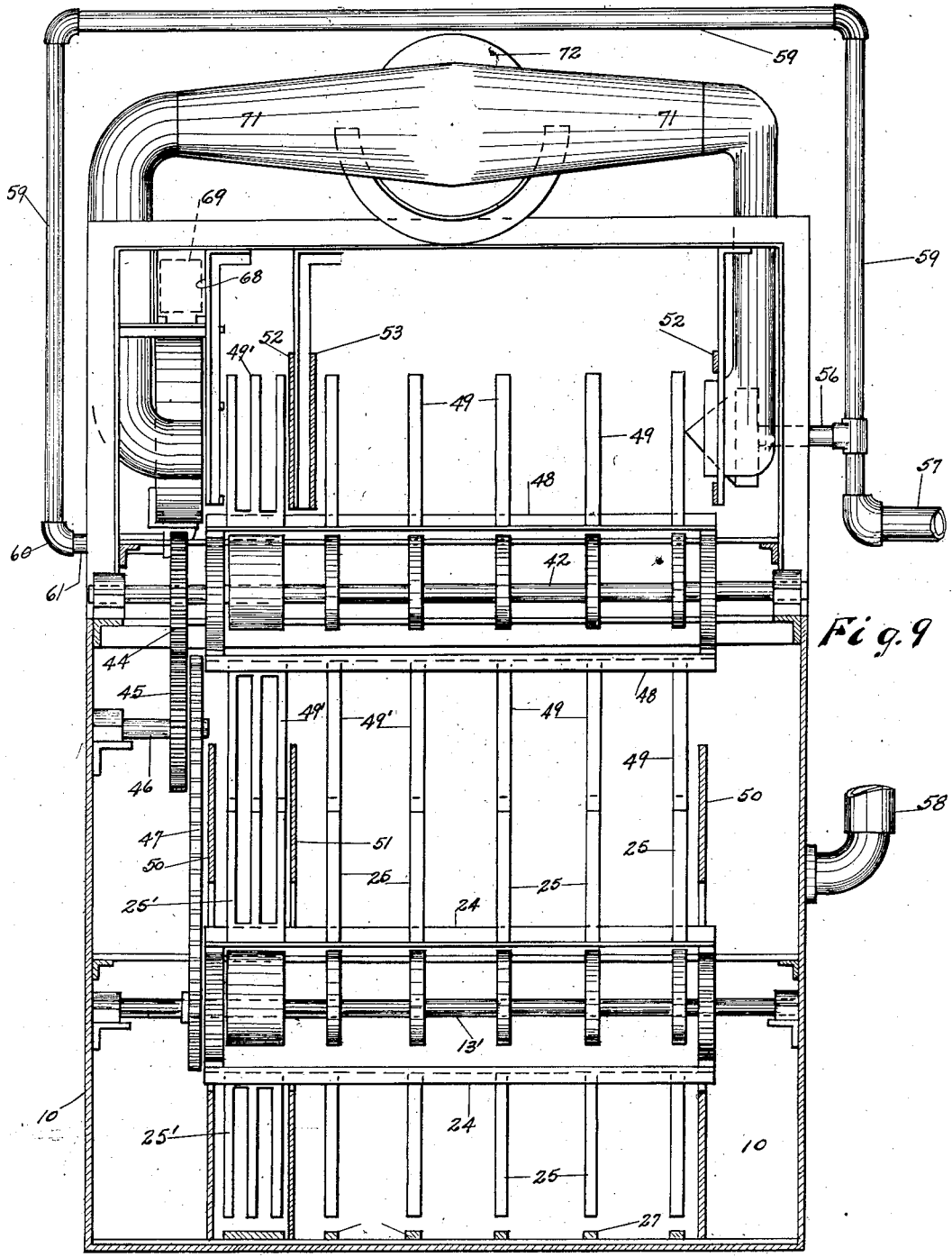

WALTER H. PAULSON, OF CHICAGO, ILLINOIS, ASSIGNOR TO HARRY D. LATHROP, OF CHICAGO, ILLINOIS.

CAN-WASHING MACHINE.

1,391,141.       Specification of Letters Patent.     Patented Sept. 20, 1921.

Application filed May 22, 1920. Serial No. 383,333.

*To all whom it may concern:*

Be it known that I, WALTER H. PAULSON, a citizen of the United States, and a resident of the city of Chicago, county of Cook, and State of Illinois, have invented certain new and useful Improvements in Can-Washing Machines, of which the following is a specification.

My invention relates to improvements in can washing machines, and has for its object the provision of an improved machine of this character especially adapted for ice-cream cans and the like. The invention is of simple construction and efficient in use.

Other objects will appear hereinafter.

The invention consists in the combinations and arrangements of parts hereinafter described and claimed.

The invention will be best understood by reference to the accompanying drawings forming a part of this specification, and in which, Figure 1, is a longitudinal vertical section taken through the upper feed end or rear portion of the machine, Fig. 2, a similar view, taken through the upper forward or delivery end of the machine, Fig. 3, a view similar to Fig. 1, but taken through the lower rear portion of the machine, Fig. 4, a view similar to Fig. 2, but taken through the lower forward portion of the machine, Fig. 5, a horizontal section of the rear end of the machine, Fig. 6, a horizontal section of the forward end of the machine, Fig. 7, a rear end view of the machine, Fig. 8, a vertical section taken through the rear end of the machine and looking forwardly, and Fig. 9, a vertical section taken through the forward end of the machine looking rearwardly.

The preferred form of construction, as illustrated in the drawings, comprises a suitable tank 10 of large size and considerable depth, and adapted and arranged to contain a considerable volume of washing fluid, consisting of hot water and washing soda. Arranged in the tank 10 is an endless chain conveyer, consisting of two parallel sprocket chains arranged and adapted to travel substantially vertically adjacent the rear wall of the tank 10, and then to travel substantially horizontally along the bottom of said tank throughout the portion 12. The sprocket chains 11—12 are arranged to travel over suitable guide sprockets 13 and 14, the guide sprockets 13 at the extreme forward end of the machine being mounted on a transverse shaft 13', and the guide sprockets 14 at the rear portion of the tank being mounted on a transverse driving shaft 15. The shaft 15 is equipped with a large driving pulley 16 connected by belt 17 with a small pulley 18 on counter-shaft 19 at the rear upper portion of the frame of the machine. The shaft 19 is connected by a system of reducing gears and shafts with the drive shaft 21 of an ordinary centrifugal blower 22 driven by an electric motor 23, as best shown in Figs. 1 and 7. By this arrangement it will be observed that the sprocket chains 11—12 will be caused to travel constantly in the directions indicated by the arrows on Figs. 3 and 4.

The sprocket chains 11—12 carry suitable cross-bars 24 in the form of angle irons, and conveying fingers 25 and 25' are mounted on said cross-bars to project at substantially right angles to the sprocket chains. The fingers 25 are spaced considerably apart, as they are designed to feed or carry the cans, while the fingers 25' are spaced closer together as they are designed to carry or convey the lids or covers on the cans. Guide slats are arranged at 26 adjacent the rear end of tank 10 and pass thence at 27 along the bottom of said tank and are turned upwardly at 29 at the forward end of the tank, said guide slats coöperating with the fingers 25 and 25' to feed or carry the ice-cream cans or lids 28 downwardly at the rear, then rolling said cans or lids along the bottom of the tank and elevating them at the front and returning them to the rear portion of the tank, as will be readily understood. An inclined can support or chute 30 is arranged at the rear end of the top of tank 10, and is of a size to support a number of cans and can lids, which, being round, will tend to roll down said chute or support into the tank. The support 30 is provided with side boards or blades 31, and with an intermediate guide partition 32, as best indicated in Fig. 5, to provide a comparatively wide chute 31' for the cans and a comparatively narrow chute 32' for the lids or covers. As best shown in Figs. 3 and 5, a rocker shaft 33 is located under the can support 30, adjacent its juncture with the tank 10, and provided with stop leaves or blades 34 and 35 projecting therefrom at right angles to each other, the shaft 33 being located immediately under suitable openings in the support 30 and operating therethrough, the blades 34 serving to stop the lowermost cans and lids and release the same by forward rocking, the blades 35 then serving to stop the next can and lid, as will be readily understood. The rocker shaft 33 is provided with rocker arm 36 connected by a link 37 with one arm 38 of a bell crank lever pivotally mounted at one side of tank 10, the other arm 39 of said bell crank lever being set in the path of the projecting ends 40 of cross-bars 24. The link 37 also carries a stop 37' set in the path of the projecting ends 40 of the cross-bars 24. The arrangement is such that as the endless conveyer 11—12 travels through the tank, each cross-bar 24, engaging the bell crank arm 39, rocks said bell crank to rock the blades 34 forwardly and downwardly and the blades 35 upwardly and forwardly. This action releases the lowermost can and can lid, stopping the next can and can lid, and permits the released can and can lid to roll into the tank 10, the mechanism being timed to cause the released cans and can lids to roll immediately upon the set of supporting fingers 25—25' immediately preceding the bar 24 which tripped the rocker shaft 33. Immediately following this action, the corresponding end 40 engages the stop 37' and restores the parts to initial positions, thus permitting the cans and can lids to roll down the support 30 until the lowermost rest against the stop blades 34, when the operation is repeated as above outlined. Thus, it will be observed that a number of cans and can lids may be placed upon the support 30 and automatically fed into the machine and then carried downwardly to the bottom thereof and rolled along the bottom in the washing or soaking compound in tank 10, to the forward end of the machine. At the forward end of the machine, the cans and lids are elevated by the combined action of the fingers 25 and 25' and the guide slats 29, and carried back to the rear portion of the machine, but still submerged in the water of tank 10. The speed of operation of the machine is slow, so that the cans and lids are thus subjected to a prolonged preliminary soaking or washing operation, during a part of which time the cans and lids are rolled or agitated in the washing fluid, and thus the dirt and grease adhering thereto loosened and softened, and in part removed, the water in tank 10 being kept in a heated condition, as will more fully appear hereinafter.

Another endless conveyer 41 is arranged immediately above and parallel to the horizontal portion of conveyer 11—12, said conveyer 41 consisting of two parallel sprocket chains passing over suitable sprockets on transverse shafts 42 and 43 at the forward and rear ends of the tank 10 and located above the top thereof. As best shown in Fig. 9, shaft 42 carries a gear 44 meshing with a gear 45 on a stud shaft 46, said gear 45 being connected by a sprocket chain 47 with a shaft 13', whereby the conveyer 41 will be driven in the direction of the arrows appearing on Figs. 2, 3 and 4. The conveyer 41 is provided with cross-bars or angles 48, carrying feed fingers 49 and 49' arranged substantially as are the fingers 25 and 25' and coöperating therewith, and with guide slats 48' at the rear, to elevate the cans and lids out of the washing compound in tank 10 and carry the same forwardly. Side boards 50 and 51 are arranged in tank 10 to coöperate with the fingers on the conveyers to hold the cans and lids in place, as best indicated in Figs. 4 and 9. Side boards 52 and 53 also coöperate with the fingers 49 and 49' to hold the cans in place during their forward travel above the level of washing fluid in tank 10. A suitable discharge platform 53' is arranged at the forward end of tank 10 and projects rearwardly between the fingers 49 and 49' sufficiently to automatically discharge the washed cans and lids, as indicated. Suitable spraying or jet nozzles 54 and 55 are arranged at one side of the conveyer 41 to project jets or sprays of the fluid into the open ends of the cans, said cans being arranged with their open ends positioned outwardly. There are three of the jets or nozzles 54 and two of the nozzles 55, as shown. As best shown in Figs. 5, 6 and 9, the nozzles 54 are connected by branch pipes 56' with a horizontal supply pipe 56 connected by a supply pipe 57 with a suitable pump, not shown. A feed pipe 58 is connected with the central portion of tank 10 and also leads to said pump, not shown, and whereby washing fluid from tank 10 is constantly supplied to the jets or nozzles 54 under pressure, to be injected in the form of sprays, into the open ends of the cans as they pass said jets or nozzles. A pipe 59 leads from the pipe 56 over the frame of the machine to a horizontal supply pipe 60 on the other side thereof. The supply pipe 60 is connected by a branch pipe 61 with three spraying heads or nozzles 62, adapted and arranged to similarly direct sprays of said washing fluid into the open ends of the lids of the cans which are arranged with their open ends outwardly. Owing to the position of the cans and lids as they pass the spraying nozzles or heads 54 and 62, the washing fluid employed will run immediately back into the tank 10, so that the washing fluid employed in the preliminary soaking of the cans and lids is also used in this preliminary washing thereof, Two additional spraying heads 63 are arranged opposite the heads or nozzles 55, and are supplied with clean hot rinsing water through supply pipes 64. The heads or nozzles 55 are also supplied with clean hot rinsing water through the supply pipes 55', and whereby sprays or jets of clean hot rinsing water are injected into the open ends of the cans. The hot water thus used in rinsing, also drains into the tank 10, serving to keep up the temperature thereof and constantly supply the same with a fresh supply of water, which will gradually serve to change the water used in the preliminary soaking and washing.

An overflow 66, in the form of a forward offset, is provided at the upper forward portion of tank 10, and a suitable drain pipe 67 leads therefrom, said overflow thus serving to constantly carry off the excess of water from the tank 10. As most of the dirt and impurities in the ice-cream cans consists of grease or butter fat, the same will rise to the top of the water in said tank and thus be drained or automatically "skimmed" therefrom, which tends to keep the supply in the tank sufficiently fresh and clean for the purpose. At suitable intervals, a suitable supply of washing soda, or other suitable chemical, is added to the water in the tank 10 to compensate for that which is constantly being withdrawn therefrom in this overflow. Another drain pipe 67' is also provided at the bottom of the tank, so that said tank may be drained when desired, but the pipe 67' is normally kept closed.

As best shown in Fig. 9, a suitable guideway 68 is provided along the upper side portion of the frame-work of the machine, adapted to accommodate mold forms 69 ordinarily used in molding bricks of ice-cream. Said mold forms 69 are placed in the guideway 68 in inverted positions and pushed therethrough by hand, suitable openings being provided in the tops of the spraying heads or nozzles 62 and 63 to permit the escape of suitable sprays for this purpose, and whereby the mold forms for ice-cream bricks may be washed or scoured when desired.

Air nozzles 70 are arranged on opposite sides of the conveyer 41 to project blasts of hot air inwardly into the open ends of the cans and lids as they pass. The air nozzles 70 are supplied through branch pipes 71 leading from a heating drum 72 located on the top of the frame of the machine, and communicating with the blower 22, as indicated, and whereby the cans and lids are thoroughly dried by blasts of hot air before they are discharged onto the discharge platform 53'. From the discharge platform the cleaned and dried cans are removed by hand, or otherwise, as desired.

By this arrangement it will be observed that the cans and their lids are carried through the machine in juxta-position to each other, so as not to become misplaced. In passing through the machine, the cans and lids are first subjected to a prolonged preliminary soaking in the hot washing fluid in the tank 10, so that the dirt, grease, and other contaminations are loosened and in part removed, which action is greatly aided by the rolling action of the cans and lids in the bottom of the tank. Then the cans and lids are subjected to a preliminary washing under forced jets or sprays of the hot washing fluid from tank 10, thus completely removing any dirt, grease or other impurities therein, or thereon. The cans and lids are then thoroughly rinsed with fresh hot rinsing water and then dried by blasts of air before being automatically discharged. In this way, the cans and lids are thoroughly cleaned and dried, with great expedition and efficiency.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. A can washing machine embodying a tank; a conveyer passing through said tank and then over the top thereof; means at one side of said conveyer for supporting cans thereon with their open sides outwardly; means on the opposite side of said conveyer for supporting can lids thereon with their open sides outwardly; and means at each side of said conveyer for directing washing fluid into said cans and lids, substantially as described.

2. A can washing machine embodying a tank; a conveyer entering said tank at one end and passing downwardly to the bottom thereof, thence along the bottom of said tank and upwardly into a higher plane and thence back substantially horizontally to adjacent the entry end of the tank and thence upwardly above the normal fluid level of said tank and across the top thereof; means at one side of said conveyer for supporting cans thereon with their open sides outwardly; means on the opposite side of said conveyer for supporting can lids thereon with their open sides outwardly; and means at each side of said conveyer for directing washing fluid into said cans and lids, substantially as described.

3. A washing machine comprising a tank;

a conveyer having a tortuous to and fro path through said tank and then passing over the top thereof; and washing means coöperating with said conveyer during its travel above said tank, substantially as described.

4. A washing machine comprising a tank; a conveyer passing downwardly into said tank adjacent one end thereof, thence along the bottom thereof and then upwardly into a higher plane and back to a position adjacent the entry end of said tank, and finally upwardly and across the top of said tank above the normal fluid level thereof; and washing means coöperating with said conveyer during its travel above said tank, substantially as described.

5. A washing machine comprising a tank; an endless chain conveyer arranged in said tank to pass downwardly therein adjacent one end thereof and then across the bottom of said tank, then upwardly into a higher plane and back toward the entry end of the tank; a second endless chain conveyer arranged in said tank above said first-mentioned conveyer, and coöperating therewith, and extending upwardly therefrom and horizontally across the top of said tank above the normal fluid level therein; and washing means coöperating with said conveyer during its travel above said tank, substantially as described.

6. A washing machine comprising a tank; a conveyer arranged to carry cans downwardly into said tank adjacent one end thereof, thence along the bottom thereof, and then elevate and return said cans in said tank above the first path of travel, and finally elevate and carry the cans across the top of said tank; means for forcing jets of washing fluid into said cans during their travel over the top of said conveyer; and an overflow for said tank, substantially as described.

7. A washing machine comprising a tank; an endless chain conveyer arranged in said tank to carry cans downwardly adjacent one end of the tank and then roll said cans across the bottom of said tank, and then elevate said cans into a higher plane and carry them back toward the entry end of the tank; a second endless chain conveyer arranged above the horizontal portion of said first-mentioned conveyer, and adapted and arranged to elevate said cans therefrom and carry said cans horizontally across the top of said tank above the normal fluid level therein; a plurality of jet nozzles arranged along one side of said upper conveyer; means for withdrawing washing fluid from said tank and forcing the same through one set of said nozzles into cans on said conveyer; means for forcing fresh rinsing fluid through the other set of jet nozzles into cans on said upper conveyer; and means for forcing a blast of hot air into said cans, substantially as described.

8. A washing machine comprising a tank; a conveyer arranged to carry cans and can lids through said tank and then over the top thereof; a plurality of jet nozzles arranged on opposite sides of said conveyer above said tank, and arranged and adapted to direct jets of fluid to said conveyer in opposite directions; means for withdrawing washing fluid from said tank and forcing the same through a jet nozzle on each side of said conveyer; means for forcing fresh rinsing fluid through a jet on each side of said conveyer; means for forcing a blast of hot air to said conveyer from each side thereof; an overflow for said tank; and means for automatically feeding cans and can lids to said conveyer, substantially as described.

9. A washing machine comprising a tank; a conveyer arranged to carry cans downwardly into said tank adjacent one end thereof, thence along the bottom thereof and then elevate and return said cans in said tank above the first path of travel and finally to carry the cans across the top of said tank; and means for washing said cans during their travel over the top of said tank, substantially as described.

In testimony whereof I have signed my name to this specification in the presence of two subscribing witnesses.

WALTER H. PAULSON.

Witnesses:
   JOSHUA R. H. POTTS,
   ROSE K. TRIB.